C. G. PULLIN.
LUBRICATING MEANS FOR BEARINGS EXTERNAL OF A HOLLOW MEMBER.
APPLICATION FILED JULY 20, 1920.
1,415,115.
Patented May 9, 1922.
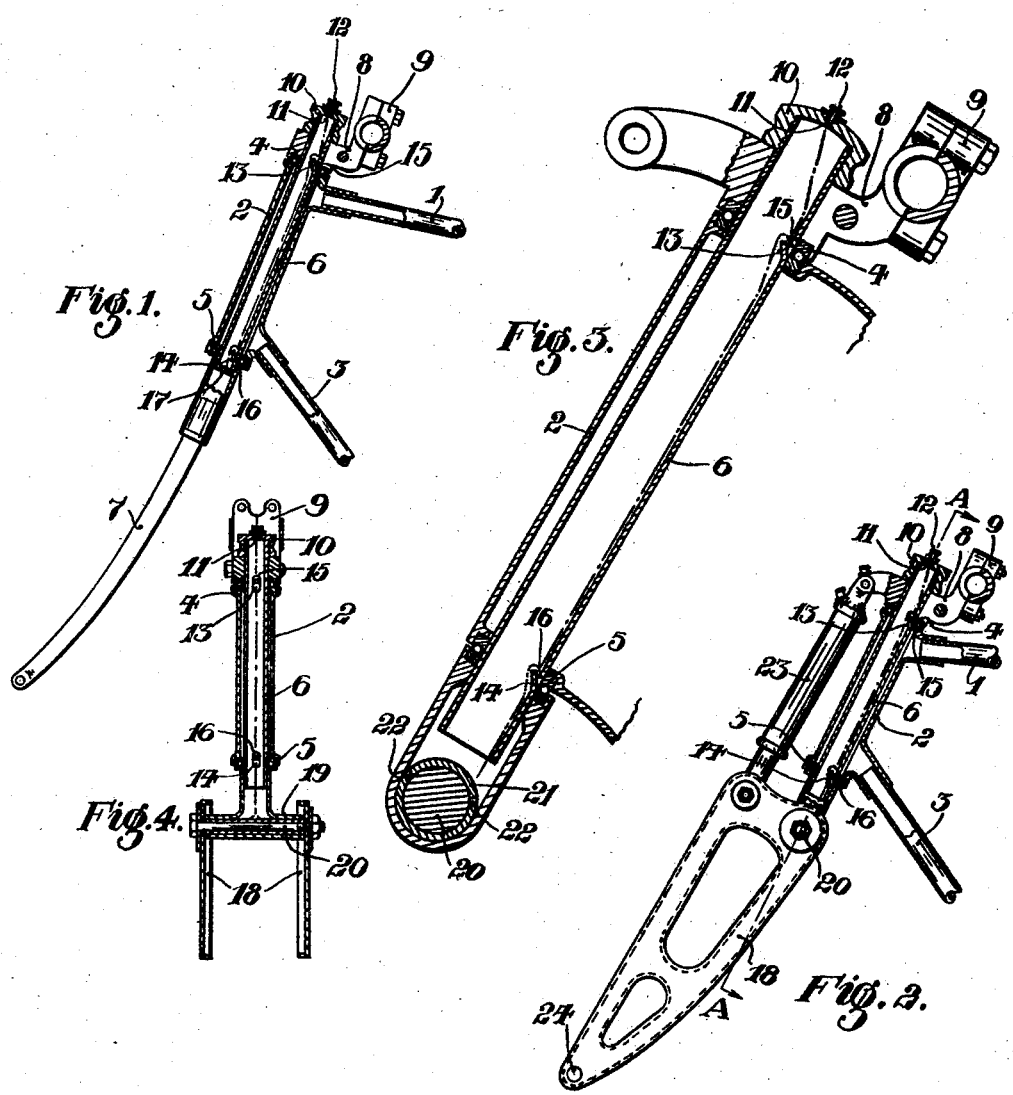
C. G. PULLIN.
Inventor.
per Eugene C. Brown
Attorney.

UNITED STATES PATENT OFFICE.

CYRIL GEORGE PULLIN, OF ISLEWORTH, ENGLAND.

LUBRICATING MEANS FOR BEARINGS EXTERNAL OF A HOLLOW MEMBER.

1,415,115.

Specification of Letters Patent.  Patented May 9, 1922.

Application filed July 20, 1920. Serial No. 397,566.

*To all whom it may concern:*

Be it known that I, CYRIL GEORGE PULLIN, a subject of the King of Great Britain, residing at Isleworth, Middlesex, England, have invented certain new and useful Improvements in an Improved Lubricating Means for Bearings External of a Hollow Member, of which the following is a specification.

This invention relates to improvements in lubricating means for bearings external of a hollow member, and particularly refers to such constructions in which more than one bearing is provided on such a hollow member.

Generally speaking the provision of means for lubricating one bearing is a simple matter, but when two or more bearings are provided which have to be lubricated from a single source the system immediately becomes complicated and expensive.

By the present invention, I provide a simple construction, effective in operation, and which enables external bearings to be rendered substantially dust-proof, that is to say, enclosed bearings.

Broadly speaking, the invention consists in an improved means of lubricating a bearing or bearings external of a hollow member which member is provided with an inner face inclined to the horizontal and in which a projection is formed adjacent each of the said bearings for the purpose of diverting a portion of a descending oil stream into its respective bearing, while allowing any excess to flow onwards, which may be used for lubricating a lower bearing or bearings.

In order that my invention may be more clearly understood, I will now describe this application with reference to Figs. 1 to 4 of the accompanying drawings, (and afterwards described with reference to Fig. 5) the embodiment of the invention as a means of lubricating the driving members on a fixed bearing member.

Referring to the drawings, Fig. 1 is an elevation partly in section of the front fork, ball head tube and frame on a pedal driven velocipede; Fig. 2 is a similar elevation of the front fork structure, ball head tube and frame of a motor driven velocipede; Fig. 3 being a detail view to an enlarged scale of the ball head tube shown in Fig. 2; Fig. 4 is a section taken on the line A, A of Fig. 2.

Referring first to Fig. 1, a usual type of velocipede frame is in part illustrated, and comprises a horizontal tube 1, a ball head bearing tube 2 and a front sloping tube 3, the tubes 1 and 3 being integrally formed with the member 2 in the well known way. The ball head bearing tube comprises seatings 4 and 5 for the upper and lower bearings of the ball head tube which is indicated by the reference numeral 6, the lower part of the tube 6 being formed in the usual way with a front fork 7 for the road wheel of the velocipede. The ball head tube 6 may have the handle bars of the velocipede connected to it in the usual way, but it is preferred to provide an attachment 8 mounted on the top of the ball head tube which is formed longer than usual, which attachment 8 is provided with a clamp 9 for the purpose of securing the handle bars, the attachment being maintained on the ball head tube by a threaded member 10 provided with an orifice 11 for the insertion of the nose of a lubricant projector, the orifice being closed with any cap device indicated at 12 as is well known in the art.

By screwing down the threaded member 10 in position, the bearings 4 and 5 are maintained in position relatively to the ball head bearing tube 2. The ball head tube 6 is provided with inwardly projecting lugs as shown at 13 and 14; these lugs being preferably formed by cutting the body of the tube and pressing in the region bounded by the cut, so that at the back of the lug, an opening 15 and 16 is provided; the lugs are so arranged that when the ball head tube is in position in the frame of the velocipede, that each of the lugs are juxtaposed adjacent one of the bearings of the ball head tube as clearly shown in the drawing.

Now if a lubricant be projected through the orifice 11 it will fall on the inner wall of the ball head tube, and flowing down under the action of gravity a stream will be formed within the tube. The lugs 13 and 14 will obstruct the path of flow and divert a portion of the stream into each bearing; thus, the lug 13 will cause a portion of the stream to flow through the opening 15 and into the bearing 4, while the lug 14 will cause oil to flow through the opening 16 and into the bearing 5. If a slow stream is projected through the orifice 11, the top bearing will first be filled and then the over-flow will pass down the tube to the bearing 14.

To prevent the oil flowing from the lower bearing on to the tyres, a diaphragm 17 is provided within the tube 6.

Instead of providing a lower lug 14 and the diaphragm 17 as just described, the diaphragm 17 may be disposed slightly higher, so as to act as the actual obstruction, diverting a portion of the oil into the bearing, in which case the port 16 will be formed by punching out completely a small portion of the body of the ball head tube 6.

In the application of the invention to motor cycles, having a pivotal front fork 18 mounted on an extremity 19 of the ball head tube 6, the lugs 15 and 16 are provided as before, but the diaphragm 17 used in the construction described with reference to Fig. 1 is omitted, in view of the fact with the oil flowing from the lower bearing may be utilized to lubricate the pivotal bearing 20 for the front forks 18. To effect this result, the extremity 19 of the ball head tube is formed by a T-shaped member and carries a sleeve 21, through which is projected the pivotal axis 20 which, in turn, secures the forks 18 against the sleeve member 21, while permitting the required relative position. It is required that lubricant be supplied between the sleeve 21 and the axis pin 20. To this end openings 22 are provided in the sleeve member so that the oil flowing from the lower bearing in the ball head tube may find access to the axis pin 20.

By this construction, it will be noticed, that the bearings are substantially enclosed, and further, that the avoidance of an oil hole projector, leading to the bearing, is avoided, thus eliminating the introduction of grit or other clogging material over the opening, to the bearing, by the projection into the opening of the nose of the lubricant projector.

The arrangement just described will be more easily understood by reference to Figs. 3 and 4, in which like parts are indicated by similar reference numerals.

In motor driven velocipedes having a lubricating device and front forks as illustrated in Fig. 2, I prefer to also provide telescopic means 23 for connecting the attachment 8 and the front corner of the triangular forks 18, suitable bearings being formed in the front forks at 24 for the reception and support of the front road wheel bearings.

Where a series of rotatable members are mounted on a fixed shaft, the application of this invention eliminates the use of the usual oil reservoir and wick systems for each bearing of the rotatable member.

It will be seen by this construction, any reasonable number of rotatable members may be lubricated by a stream from the single source and further, that the bearing surfaces are substantially enclosed, thereby preventing as much as possible, the ingress of dirt, grit, or the like.

Within the ambit of this invention a plurality of projections may be formed for each bearing, and, instead of punching out the projections from the body of the tube, cup or like members may be formed, but in all cases the obstructing member projecting into the stream is directed to deflect a portion of the stream to the bearing. It will further be observed that it may be advisable in some cases when several bearings are on the one tube to stagger the alignment of the projections in order to more quickly obtain the flow to each bearing when desired, but for ordinary purposes, as in a ball head tube, the provision of projections in alignment with the axis of the tube will suffice.

In some of the constructions outlined it will be observed that after all the bearings external to a hollow tube have been lubricated the flow will continue past the projections and will begin to fill up the interior. Means may therefore be provided for tapping this reserve and introducing it again at the origin of the stream.

The constructions embodying the present invention have been found to be equally effective when the hollow member is itself rotated on its axis or oscillated thereon, or when the bearings are carried in a frame or like structure which revolves or oscillates about the axis of the aforesaid hollow member.

I claim:

1. In combination, on a velocipede, a ball head tube, a frame, a ball race for said ball head tube at the top of the frame, a perforation in said ball head tube adjacent said ball race, and a projection within said ball head tube adjacent said perforation, a lower ball race towards the bottom of said frame, a perforation in said ball head tube adjacent said lower ball race, and a projection in said ball head tube adjacent said last mentioned perforation, an inlet for a lubricant at the head of said ball head tube and an outlet therefor at the bottom of said ball head tube, the said projections being so constructed as to divert a portion of the lubricant supplied through the inlet to its respective bearing through its adjacent perforation.

2. In combination, on a velocipede, a ball head tube, a frame, a ball race towards the top of said frame for said ball head tube, a perforation in said ball head tube adjacent said ball race, a projection within said ball head tube adjacent said perforation, a lower ball race towards the bottom of said frame for said ball head tube, a perforation in said ball head tube adjacent said lower ball race, and a diaphragm closing the underside of said ball head tube and disposed adjacent said last mentioned perforation, an inlet for lubricant supply at the head of said ball head tube, the said projection and diaphragm being so arranged adjacent their respective perforations that a portion of the lubricant supplied is diverted into their respective ball races.

3. In combination, on a velocipede, a ball head tube, a frame, a ball race for said ball head tube at the top of the frame, a perforation in said ball head tube adjacent said ball race, and a projection within said ball head tube adjacent said perforation, a lower ball race towards the bottom of said frame, a perforation in said ball head tube adjacent said lower ball race, and a projection in said ball head tube adjacent said last mentioned perforation, an inlet for a lubricant at the head of said ball head tube and an outlet therefor at the bottom of said ball head tube, the said projections being formed adjacent their respective perforations by partially cutting the body of the ball head tube and pressing in the cut portion in order to form the projections and the required perforations which are so arranged that they are adapted to divert a portion of the lubricant supplied through the inlet to its respective bearing through its adjacent perforation.

In testimony whereof I affix my signature.

CYRIL GEORGE PULLIN.